J. PIPER.
BEAN HARVESTER.
APPLICATION FILED MAR. 21, 1914.

1,124,059.

Patented Jan. 5, 1915.
3 SHEETS—SHEET 2.

WITNESSES
E. M. Callaghan
C. E. Traynor

INVENTOR
JOSEPH PIPER,
BY Munn & Co.
ATTORNEYS

J. PIPER.
BEAN HARVESTER.
APPLICATION FILED MAR. 21, 1914.
1,124,059.
Patented Jan. 5, 1915.
3 SHEETS—SHEET 3.
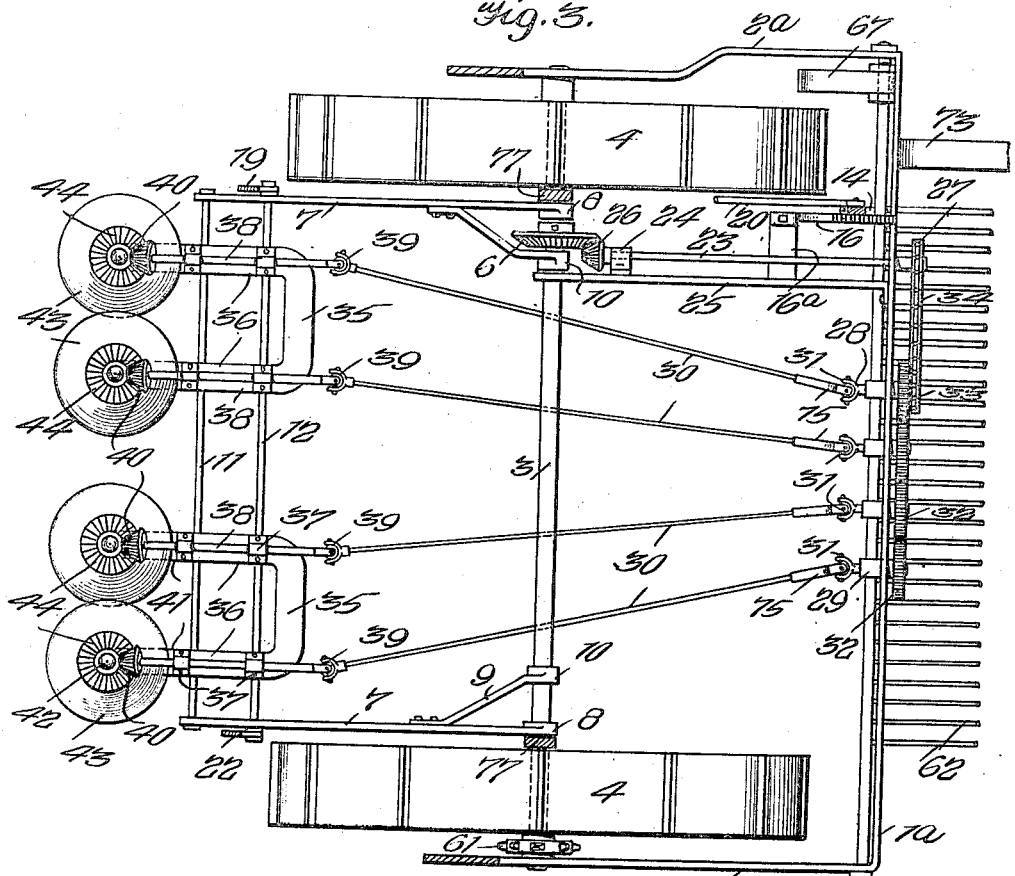
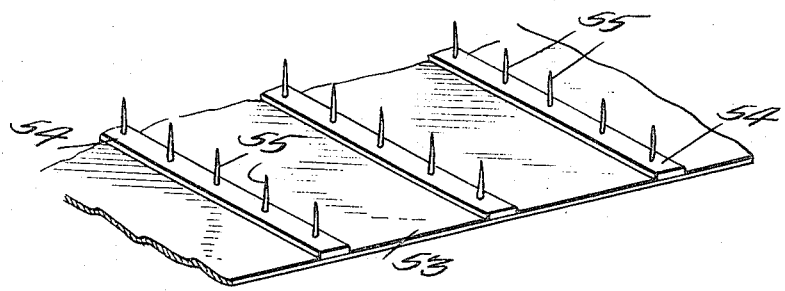
WITNESSES
INVENTOR
JOSEPH PIPER,
BY
ATTORNEYS

UNITED STATES PATENT OFFICE.

JOSEPH PIPER, OF LELAND, IDAHO.

BEAN-HARVESTER.

1,124,059.  Specification of Letters Patent.  Patented Jan. 5, 1915.

Application filed March 21, 1914. Serial No. 826,220.

*To all whom it may concern:*

Be it known that I, JOSEPH PIPER, a citizen of the United States, and a resident of Leland, in the county of Nez Perce and State of Idaho, have made certain new and useful Improvements in Bean-Harvesters, of which the following is a specification.

My invention is an improvement in bean harvesters, and has for its object to provide a harvester of the character specified, adapted to cut the plants as they grow in the fields, and wherein means is provided for cutting the plants at any desired height from the ground, and for delivering the plants to dropping mechanism, by means of which the plants may be arranged in windrows.

Figure 1:
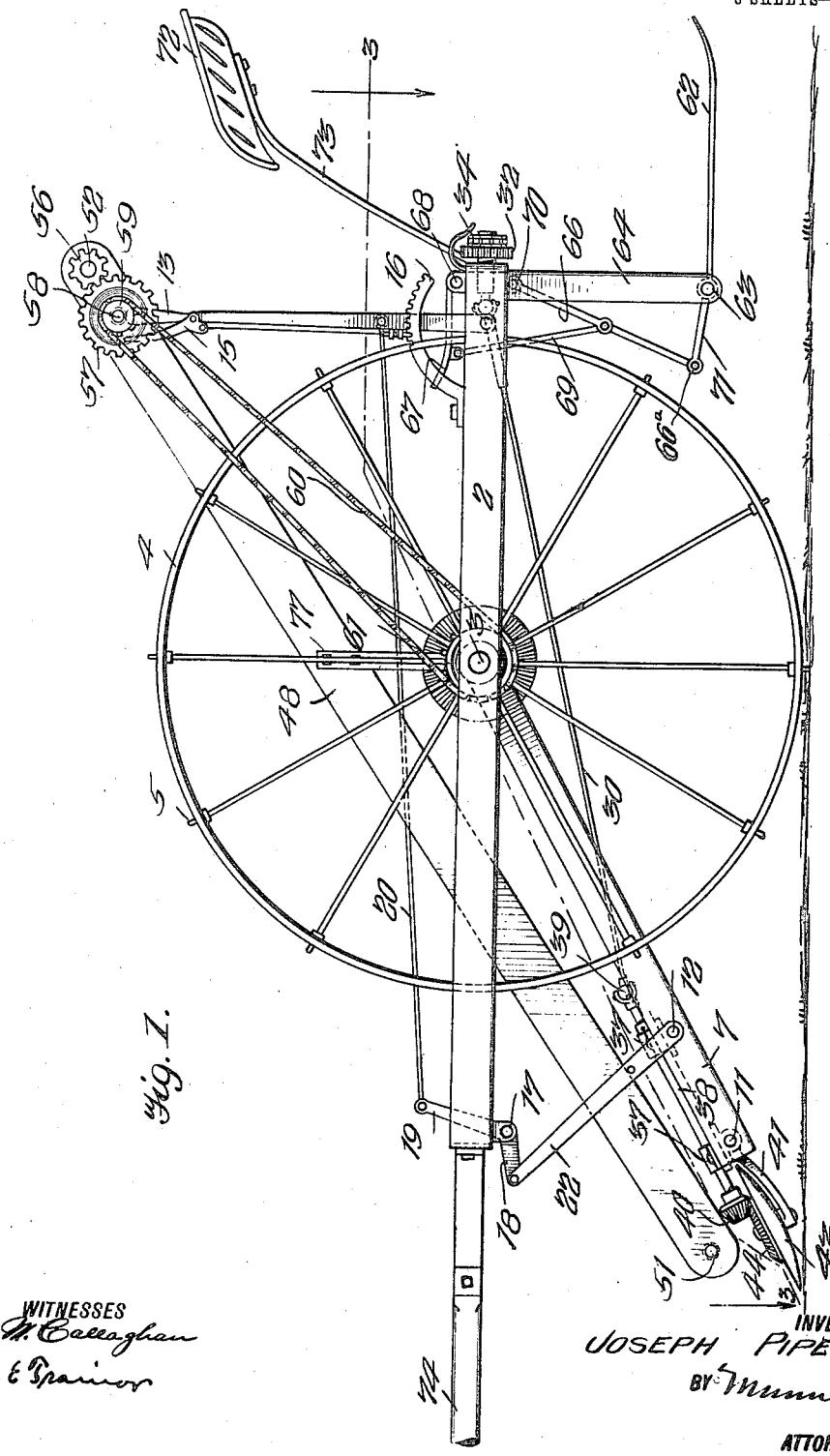
Figure 2:
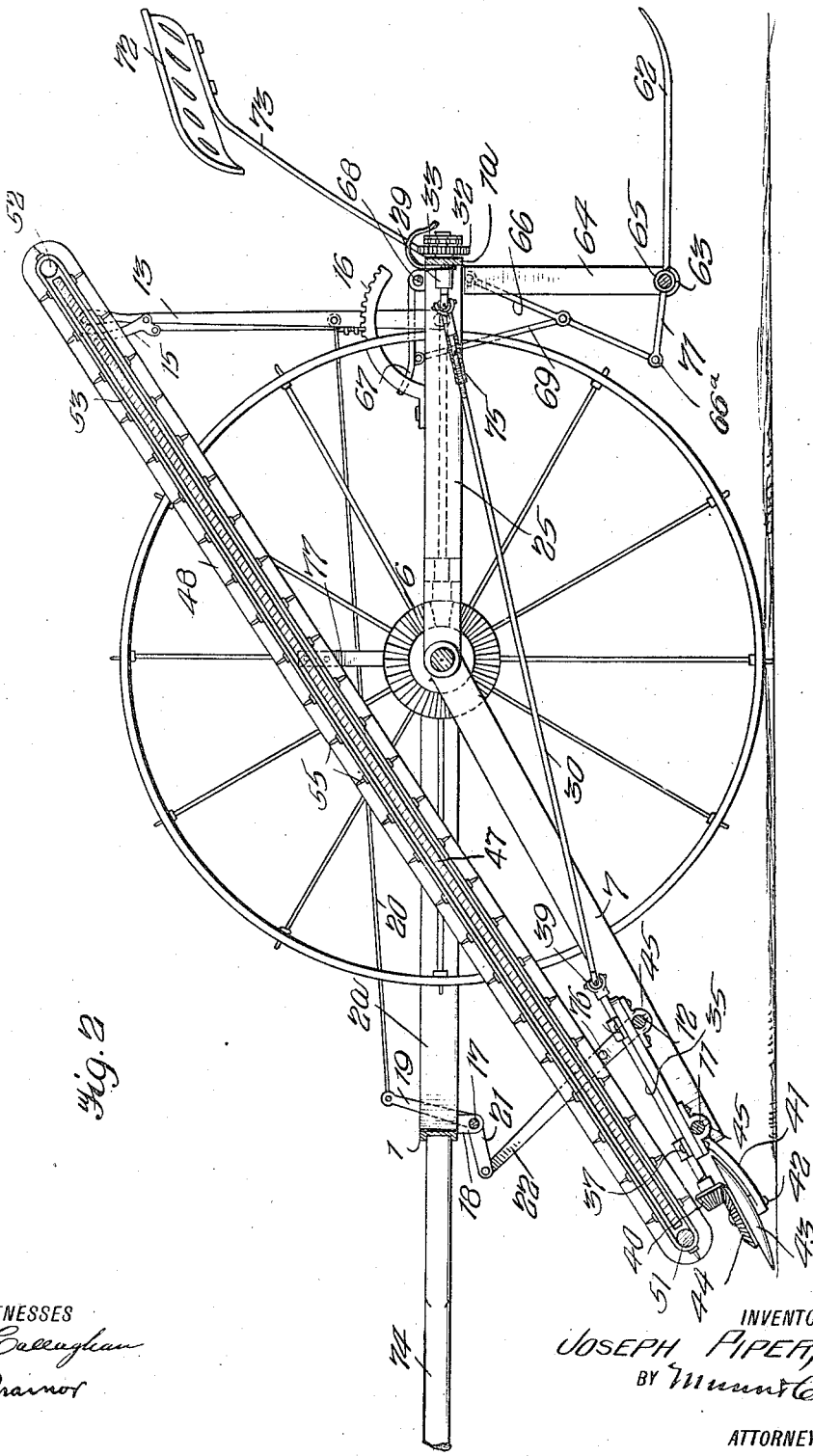

In the drawings: Figure 1 is a side view of the improved harvester, Fig. 2 is a longitudinal vertical section, Fig. 3 is a section on the line 3—3 of Fig. 1, looking in the direction of the arrows, and Fig. 4 is a perspective view of a portion of the endless conveyer.

The present embodiment of the invention comprises a main frame, of substantially rectangular shape, and comprising front and rear bars 1 and 1ª, and side bars 2 and 2ª. An axle 3 is journaled transversely of the main frame in the arms 2 and 2ª, and wheels 4 are secured to the axle near the ends thereof, and within the frame. The wheels are of usual construction, having transverse cleats 5 on their peripheries, and a bevel gear wheel 6 is secured to the axle adjacent to one of the wheels.

An auxiliary frame is supported by the axle, the said frame comprising arms 7, each of which is provided at its rear end with a bearing 8 for engaging the axle, and braces 9 are connected with the arms at the inner sides thereof and near the axle, each brace inclining outwardly from the adjacent arm and extending rearwardly, and having a bearing 10 at its rear end for engaging the axle.

The arms 7 are connected at their front ends by shafts 11 and 12 respectively, and the cutting mechanism to be later described is supported by the arms and the shafts. The auxiliary frame constituted by the arms 7 and the shafts 11 and 12 is mounted to swing on the axle, and is adjusted with respect to the axle, by means of a lever 13 pivoted to a bracket 14 extending forwardly from the rear bar 1ª, and the lever is provided with the usual latch mechanism 15, for coöperating with a toothed sector 16 supported by a bracket 16ª, for holding the lever in adjusted position.

A shaft 17 is journaled transversely of the main frame below the front bar 1 in bearing lugs 18 depending from the main frame, and the said shaft is provided with an upstanding arm 19, which is connected to the lever by means of a link 20. Near each end the shaft 17 is provided with radial arms 21, and each arm is connected to the adjacent end of the shaft 12 by means of a link 22. It will be evident that when the lever 13 is swung in the proper direction, the auxiliary frame may be raised and lowered.

A countershaft 23 is journaled longitudinally of the main frame, in the rear bar 1ª and in a bearing 24 connected with a brace 25, which is secured at its rear end to the rear bar 1ª, and at its front end is journaled on the axle 3. The shaft 23 is provided with a bevel pinion 26 which meshes with the bevel gear 6 on the axle. The countershaft extends beyond the rear bar 1ª of the main frame, and at its rear end the said shaft is provided with a sprocket wheel 27. Four stub shafts 28 are journaled in bearings 29 supported by the rear bar 1ª of the main frame, and each of the stub shafts is connected to the rear end of a connecting rod 30, by means of a universal joint 31.

Gear wheels 32 are secured to the rear ends of the stub shafts, and the said gear wheels mesh with each other, to constrain the four stub shafts to rotate at the same speed. A sprocket wheel 33 is secured to the stub shaft 28 which is adjacent to the countershaft 23, and a sprocket chain 34 connects the said wheel with the wheel 27. Thus the four stub shafts are driven from the countershaft, and since the said stub shafts are geared together by the gear wheels 32, they will rotate together at the same speed, but with the alternate shafts moving in the opposite direction to the intermediate shafts.

A plurality of substantially U-shaped frames are connected with the shafts 11 and 12, each frame comprising a body 35 arranged parallel with the shafts 11 and 12 and in rear of the shaft 12, and arms 36 extending forwardly in parallel relation transversely of the said shafts. A plurality of alined bearings 37 is supported by each arm of each frame, and a driving shaft 38 is journaled in each pair of bearings. Each of the driving shafts is connected at its rear end to the end of the adjacent connecting rod 30, by means of a universal joint 39, and the front end of each of the said driving shafts has secured thereto a bevel gear 40.

A bearing plate 41 is connected with each arm 36 of each of the frames 35—36, at the lower end thereof, and on the under face of the arm, and a stub shaft 42 is journaled transversely of the lower end of each bearing plate. A concavo-convex cutting disk 43 is secured to each shaft, above the bearing plate, and each of the said disks is arranged with its concave face upward. A bevel gear wheel 44 is secured to each shaft above the disk, and each of the bevel gears meshes with the adjacent bevel gear 40.

It will be noted from an inspection of Fig. 3, that the disks of each U-shaped frame are of such size that their cutting edges overlap between the arms 36 of the frame. The frames are spaced apart from each other a distance such that the central disks of the four will be spaced apart. Thus the disks are arranged in two series, and the disks of each series overlap. Since the alternate gear wheels 33 rotate in the opposite direction to the intermediate gear wheels, the members of each pair of disks rotate in opposite directions.

The arms 36 of the U-shaped frames 35—36 have bearings 45 on their under faces, which are slidable on the shafts 11 and 12. The common chord between the members of the pairs of disks are spaced apart a distance corresponding approximately to the distance between the adjacent rows, and the frames 35 and 36 are mounted to slide on the shafts 11 and 12, to automatically adjust themselves to variations in the distance between adjacent rows. The bearings 45 are sufficiently loose, to permit each cutting device constituted by the frame 35—36 and connected parts to be moved by the plants in the row. That is should for instance one disk of a pair strike the plant first, the frame 35—36 on which the disk is supported will be moved laterally on the shafts 11—12, to bring the plant at the overlapping of the disks. The cutting devices thus automatically adjust themselves to the variations of the plants. It will be understood that the stalks are strong enough to move the frame. By means of the lever 13, the two cutting mechanisms may be adjusted to cut the plants at any desired height.

When the plants have been cut they pass on to an endless carrier which extends the full width of the machine, which is supported in a frame comprising a bottom plate 47 and side plates 48, which extend above and below the bottom plate. Rollers 51 and 52 are journaled between the side plates, at the ends of the plate 47, and the endless carrier is supported by the rollers. The endless carrier comprises an endless belt 53 of suitable material, having secured to the outer face thereof and in transverse relation a series of slats 54, the said slats being spaced apart at equal distances. A series of teeth 55 is connected with each of the slats, the teeth extending upwardly as shown in spaced relation.

A pinion 56 is secured to one end of the roller 52, outside the adjacent side plate 48, and the pinion meshes with a gear wheel 57, on a stub shaft 58 which is journaled in the side plate. A sprocket wheel 59 is secured to the stub shaft, and a sprocket chain 60 connects the sprocket wheel 59 with a sprocket wheel 61 on the axle. The arrangement is such that the upper run of the endless carrier will move toward the roller 52, and at its lower end the carrier rests upon pins 76 connected with the links 22. Each pin extends laterally inward from the link, and the lower edges of the side plates rest upon the pins. The lower end of the carrier is thus supported by the links, and the said lower end is adjusted with the cutting mechanism, so that the lower end of the elevator is directly above the cutting mechanisms, and in position to receive the plants as they are cut. The endless carrier supporting frame is supported by the pins 76 and by arms or struts 77. Each of the struts 77 is secured to a side plate 48 at one end and engages the axle at the other, as shown in Fig. 3. As the plants pass from the rear end of the elevator they drop upon a dropping device, consisting of a series of supporting fingers 62, each of which is secured to a shaft 63, journaled in bearing arms 64 which depend from the rear end of the main frame. The fingers are arranged in the same plane, each having a bearing 65 at its front end for engaging the shaft, and the rear end of each of the said fingers is bent upwardly, as shown, to prevent dislodgment of the plants.

The dropper or carrier constituted by the fingers 62 is normally held in approximately horizontal position, by means of a toggle joint consisting of members 66 and 66ª. The members of the toggle are normally held in alinement by means of a trip, comprising a foot plate 67 hinged to the frame at 68, and connected to the joint of the toggle by a link 69. The uppermost member of the toggle is pivoted to the frame as shown at 70, and the lowermost member is pivoted to an arm 71 extending forwardly from the shaft 63. So long as the foot plate 67 is held downward by the foot of the driver, the members of the toggle joint will be held in alinement, and the dropper or carrier will be held approximately horizontal. When it is desired to discharge the carrier or dropper, the foot is lifted from the foot plate, and the weight on the fingers will break the toggle joint permitting the load to discharge from the fingers.

A seat 72 is supported above and in rear of the main frame by means of a plate 73, and the said seat is arranged at one side of the machine, near the foot plate 67 and the lever 13. The machine may be drawn through the field by means of a tongue 74, and to permit the lateral adjustment of the U-shaped frames 35—36, the connecting rods 30 are adjustable in length. At its rear end each of the said rods fits within a socket 75, and the interior of the socket is polygonal in cross section, as is also that portion of the rod which engages the socket. The rods are thus freely expansible and contractible, to permit the free movement of the frames 35—36.

The operation of the improved harvester is as follows: The machine is drawn through the field in any desired manner, with the cutting mechanisms arranged as shown in Fig. 3. The said mechanisms are adjusted to the desired height, by means of the lever 13, the elevator being adjusted at the same time. As the cutting disks 43 engage the plants, they will be moved laterally, to bring each plant at the intersection of the adjacent pair of disks. Should for instance a plant be out of line, the cutting mechanism which the plant strikes will be moved laterally, to bring the plant at the intersection. The endless belt 53 is of canvas or like material, and as the plants are cut they are engaged by the spikes 55, and are carried upwardly and rearwardly by the elevator, dropping at last onto the dropper or carrier. When a sufficient load has accumulated on the dropper, the driver releases the treadle 67, and the load is discharged. The cut plants may be thus arranged in windrows transversely of the field and as soon as the dropper has discharged its load, the depression of the foot plate 57 will return the parts to normal position. The spikes 55 will engage the plants before they are cut, so that they will not fall down on the ground and be passed over. The links 30 move freely in the sockets, to permit the lateral adjustemnt of the cutting devices. With the improved machine, after it is once adjusted to height, the only further attention required on the part of the operator is with regard to the dropping mechanism. The cutting mechanism will follow the rows, and if the dropper is operated at the proper time, the machine will operate correctly without any attention from the operator. There is a shield plate 78 at the rear of the main frame, the said plate extending over the gear wheels 32 and the sprocket wheels 27 and 33, to prevent clogging of the said wheels by the plants.

I claim:—

1. A bean harvester comprising a main frame, an axle journaled transversely of the frame, wheels secured to the axle, an auxiliary frame mounted at its rear end to swing on the axle and extending forwardly and downwardly, means for raising and lowering the front end of the auxiliary frame, a plurality of substantially U-shaped brackets supported by the auxiliary frame at the front thereof and freely movable toward and from each other, each bracket comprising a body and arms extending forwardly beyond the front end of the auxiliary frame, a stub shaft journaled vertically at the front end of each arm, a concavo-convex cutting disk secured to each shaft above the arm, the disks of each bracket lapping at their edges, a driving shaft journaled on each arm of each bracket and having a driving connection with the adjacent stub shaft, a series of stub shafts journaled in parallel relation at the rear end of the main frame, a driving connection between the shafts for causing them to rotate together at the same speed and with the alternate shafts moving in the opposite direction to the intermediate shafts, a driving connection between one of the said shafts and the axle, a link connecting each stub shaft with the adjacent driving shaft and having a universal joint connection with the shaft, each link being extensible and contractible, an elevator having its front end adjacent to the cutter and inclining upwardly and delivering at the rear of the main frame, a connection between the raising and lowering means for the front end of the auxiliary frame and the front end of the elevator for adjusting the said front end with the auxiliary frame, and dropping mechanism at the rear of the main frame and supported thereby for receiving the cut beans, and releasable means for normally holding the said dropping means in receiving position.

2. A bean harvester comprising a main frame, an axle journaled transversely of the frame, wheels secured to the axle, an auxiliary frame mounted at its rear end to swing on the axle and extending forwardly and downwardly, means for raising and lowering the front end of the auxiliary frame, a plurality of substantially U-shaped brackets supported by the auxiliary frame at the front thereof and freely movable toward and from each other, each bracket comprising a body and arms extending forwardly beyond the front end of the auxiliary frame, a stub shaft journaled vertically at the front end of each arm, a concavo-convex cutting disk secured to each shaft above the arm, the disks of each bracket lapping at their edges, a driving shaft journaled on each arm of each bracket and having a driving connection with the adjacent stub shaft, a series of stub shafts journaled in parallel relation at the rear end of the main frame, a driving connection between the shafts for causing them to rotate together at the same speed and with the alternate shafts moving in the opposite direction to the intermediate shaft, a driving connection between one of the said shafts and the axle, an extensible and contractible connection between each driving shaft and the adjacent stub shaft, dropping mechanism at the rear of the main frame, and means for receiving the cut plants from the disks and delivering them to the dropping mechanism.

3. A bean harvester comprising a main frame, an axle journaled transversely of the frame, wheels secured to the axle, an auxiliary frame mounted at its rear end to swing on the axle and extending forwardly and downwardly, means for raising and lowering the front end of the auxiliary frame, a plurality of substantially U-shaped brackets supported by the auxiliary frame at the front thereof and freely movable toward and from each other, each bracket comprising a body and arms extending forwardly beyond the front end of the auxiliary frame, a stub shaft journaled vertically at the front end of each arm, a concavo-convex cutting disk secured to each shaft above the arm, the disks of each bracket lapping at their edges, a driving shaft journaled on each arm of each bracket and having a driving connection with the adjacent stub shaft, a driving connection between the shafts and the axle for rotating the shafts of each bracket in opposite directions, dropping mechanism at the rear of the main frame, and means for conveying the plants from the disks to the dropping mechanism.

4. A bean harvester comprising a main frame, an axle journaled transversely of the frame, wheels secured to the axle, an auxiliary frame mounted at its rear end to swing on the axle and extending forwardly and downwardly, means for raising and lowering the front end of the auxiliary frame, a plurality of substantially U-shaped brackets supported by the auxiliary frame at the front thereof and movable toward and from each other, each bracket comprising a body and arms extending forwardly beyond the front end of the auxiliary frame, a cutting disk journaled on the front ends of each of the arms, the disks of each bracket overlapping, and a driving connection between each disk and the axle for constraining the disks of each bracket to rotate in opposite directions, dropping mechanism at the rear of the frame, and means for carrying the cut plants from the disk to the dropping mechanism.

5. A bean harvester comprising a main frame, an axle journaled transversely of the frame, wheels secured to the axle, an auxiliary frame mounted at its rear end to swing on the axle and extending forwardly and downwardly, means for raising and lowering the front end of the auxiliary frame, a plurality of substantially U-shaped brackets supported by the auxiliary frame at the front thereof and movable toward and from each other, each bracket comprising a body and arms extending forwardly beyond the front end of the auxiliary frame, a stub shaft journaled vertically at the front end of each arm, a concavo-convex cutting disk secured to each shaft above the arm, the disks of each bracket lapping at their edges, a driving shaft journaled on each arm of each bracket and having a driving connection with the adjacent stub shaft, and a driving connection between the shafts and the axle for rotating the shafts of each bracket in opposite directions.

6. A bean harvester comprising a main frame, an axle journaled transversely of the frame, wheels secured to the axle, an auxiliary frame mounted at its rear end to swing on the axle and extending forwardly and downwardly, means for raising and lowering the front end of the auxiliary frame, a plurality of substantially U-shaped brackets supported by the auxiliary frame at the front thereof and movable toward and from each other, each bracket comprising a body and arms extending forwardly beyond the front end of the auxiliary frame, a cutting disk journaled on the front end of each of the arms, the disks of each bracket overlapping, and a driving connection between each disk and the axle for constraining the disks of each bracket to rotate in opposite directions.

7. A bean harvester comprising a main frame, wheels for supporting the frame, an auxiliary frame pivoted at its rear end to the main frame and extending forwardly and downwardly therefrom, means for raising and lowering the front end of the auxiliary frame, a plurality of supporting brackets at the front end of the auxiliary frame and extending beyond the front end of the said frame, a pair of cutting disks journaled on each bracket for rotation on vertical axes and with their edges lapping, a driving connection between each pair of disks and the wheels for rotating the disks in opposite directions, said brackets being freely movable toward and from each other and means for guiding the brackets.

8. In a bean harvester, a main frame, an axle journaled transversely of the frame intermediate the ends thereof, wheels secured to the axle, an auxiliary frame journaled at its rear end on the axle and extending forwardly and downwardly, means for raising and lowering the front end of the auxiliary frame, shafts arranged transversely of the auxiliary frame at the front thereof, supporting brackets freely movable on the shafts toward and from each other, and a cutting mechanism on each bracket, and a driving connection between the axle and each cutting mechanism.

9. In a bean harvester, a main frame, an auxiliary frame in connection with the main frame, shafts supported by the auxiliary frame transverse to the main frame, and a plurality of cutting mechanisms slidable longitudinally of the shafts and arranged to be moved by the plants.

10. In a bean harvester, a supporting frame, a plurality of cutting mechanisms mounted to slide freely laterally with respect to the frame toward and from each other, and adapted to be engaged and moved by the plants, and means for supporting and guiding the said mechanisms in their movement.

11. In a bean harvester, a supporting frame, a plurality of pairs of cutting mechanisms, each cutter of a pair coöperating with the other cutter of the said pair, and the pairs being mounted to move freely with respect to the frame toward and from each other and adapted to be moved by the plants, and means for supporting and guiding the said mechanisms in their movement.

12. In a bean harvester, a supporting frame, guide mechanism arranged transversely of the frame, a pair of coöperating cutting disks, and a support for the disks mounted on the guiding mechanism and slidable laterally of the frame and adapted to be moved by the direct engagement of the cutting disks with the plants.

JOSEPH PIPER.

Witnesses:
VERN FLESHMAN,
WALTER HOFFMAN.